US011525053B2

(12) United States Patent
Sung et al.

(10) Patent No.: US 11,525,053 B2
(45) Date of Patent: *Dec. 13, 2022

(54) THERMOPLASTIC RESIN COMPOSITION

(71) Applicant: LG CHEM, LTD., Seoul (KR)

(72) Inventors: Da Eun Sung, Daejeon (KR); Yong Yeon Hwang, Daejeon (KR); Chun Ho Park, Daejeon (KR); Yong Hee An, Daejeon (KR); Jeong Min Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/052,507

(22) PCT Filed: Oct. 29, 2019

(86) PCT No.: PCT/KR2019/014348
§ 371 (c)(1),
(2) Date: Nov. 2, 2020

(87) PCT Pub. No.: WO2020/091370
PCT Pub. Date: May 7, 2020

(65) Prior Publication Data
US 2021/0238404 A1    Aug. 5, 2021

(30) Foreign Application Priority Data

Oct. 31, 2018  (KR) .......... 10-2018-0132194
Oct. 25, 2019  (KR) .......... 10-2019-0133947

(51) Int. Cl.
*C08L 51/00* (2006.01)
*C08L 23/08* (2006.01)
*C08L 25/12* (2006.01)

(52) U.S. Cl.
CPC ......... *C08L 51/003* (2013.01); *C08L 23/0869* (2013.01); *C08L 25/12* (2013.01); *C08L 2201/08* (2013.01); *C08L 2205/025* (2013.01); *C08L 2205/035* (2013.01)

(58) Field of Classification Search
CPC .. C08L 2205/025; C08L 51/003; C08L 51/04; C08L 25/12
See application file for complete search history.

(56) References Cited

U.S. PATENT DOCUMENTS

| | | | |
|---|---|---|---|
| 3,446,760 A * | 5/1969 | Jones .................... | C08F 212/08 525/227 |
| 7,417,088 B2 | 8/2008 | Ahn et al. | |
| 8,372,518 B1 | 2/2013 | Hausmann et al. | |
| 2003/0153710 A1 | 8/2003 | Shin et al. | |
| 2014/0235749 A1 | 8/2014 | Kim et al. | |
| 2016/0060446 A1 | 3/2016 | Park et al. | |
| 2018/0002522 A1 | 1/2018 | Kim et al. | |
| 2019/0119487 A1 | 4/2019 | Michaelis De Vasconcellos et al. | |
| 2019/0185655 A1 | 6/2019 | Park et al. | |
| 2019/0194445 A1 | 6/2019 | Shin et al. | |
| 2019/0264021 A1 | 8/2019 | Fischer et al. | |
| 2020/0148872 A1 | 5/2020 | Schulz et al. | |
| 2020/0283614 A1 | 9/2020 | Kim et al. | |
| 2021/0024735 A1 * | 1/2021 | Park ........................ | C08L 25/16 |
| 2021/0171695 A1 | 6/2021 | Kim et al. | |

FOREIGN PATENT DOCUMENTS

| | | |
|---|---|---|
| CN | 103958599 A | 7/2014 |
| JP | 2004521995 A | 7/2004 |
| JP | 2013057084 A | 3/2013 |
| JP | 2014527570 A | 10/2014 |
| JP | 2014533763 A | 12/2014 |
| JP | 2018507927 A | 3/2018 |
| JP | 2019512584 A | 5/2019 |
| KR | 100570430 B1 | 4/2006 |
| KR | 10-2012-0079861 A | 7/2012 |
| KR | 10-2015-0072095 A | 6/2015 |
| KR | 10-2017-0005288 A | 1/2017 |
| KR | 10-2017-0103726 A | 9/2017 |
| KR | 10-2018-0023492 A | 3/2018 |
| KR | 10-2018-0066812 A | 6/2018 |
| KR | 10-2018-0076637 A | 7/2018 |
| KR | 10-2019-0065944 A | 6/2019 |
| KR | 10-2019-0114898 A | 10/2019 |
| WO | 2017182452 A1 | 10/2017 |
| WO | WO2018060111 A1 | 4/2018 |
| WO | WO2019020677 A1 | 1/2019 |

OTHER PUBLICATIONS

Extended European Search Report for EP19877964.7 dated May 25, 2021.
Examination Report from government of India for related Application No. 202017057409, dated Aug. 17, 2022.

* cited by examiner

*Primary Examiner* — Jeffrey C Mullis

(57) ABSTRACT

Provided is a thermoplastic resin composition which includes: a graft copolymer including a $C_4$ to $C_{10}$ alkyl (meth)acrylate-based monomer unit, a styrene-based monomer unit, and a vinyl cyan-based monomer unit; a first styrene-based copolymer including a $C_1$ to $C_3$ alkyl-substituted styrene-based monomer unit and a vinyl cyan-based monomer unit; and a second styrene-based copolymer including an unsubstituted styrene-based monomer unit and a vinyl cyan-based monomer unit. The thermoplastic resin composition is remarkably excellent in heat resistance, chemical resistance, and appearance characteristics while maintaining basic properties.

16 Claims, No Drawings

THERMOPLASTIC RESIN COMPOSITION

CROSS-REFERENCE TO RELATED APPLICATION

This application is a National Phase of International Application No. PCT/KR2019/014348, which claims priority to and the benefit of Korean Patent Application No. 10-2018-0132194, filed on Oct. 31, 2018, and Korean Patent Application No. 10-2019-0133947, filed on Oct. 25, 2019, the disclosures of which are incorporated herein by reference in their entirety.

TECHNICAL FIELD

The present invention relates to a thermoplastic resin composition, specifically, a thermoplastic resin composition excellent in heat resistance, chemical resistance, and appearance characteristics.

BACKGROUND ART

Generally, an acrylic-based graft copolymer formed by graft polymerization of an acrylic-based rubber polymer with an aromatic vinyl-based monomer and a vinyl cyan-based monomer exhibits excellent weather resistance and excellent aging resistance. A thermoplastic resin composition including such an acrylic-based graft copolymer is used in various fields such as automobiles, ships, leisure products, building materials, horticultural products, and the like, and the usage thereof is rapidly increasing.

Meanwhile, with an increased need of a user for emotional quality, research to realize a classy appearance, excellent colorability, and excellent weather resistance by finishing base materials such as PVC, steel sheets, and the like with the thermoplastic resin composition has been conducted.

Since a decorative sheet including an acrylic-based graft copolymer exhibits excellent processing stability compared to conventional PVC or PP and does not include a heavy metal component, it has attracted attention as an environmentally friendly material. However, the decorative sheet has a problem in which pressure marks are left during the storage process or the dimensions of the sheet are deformed (expanded or reduced) during processing. In addition, when an adhesive is used for adhesion to the base material, the decorative sheet may be dissolved due to poor chemical resistance.

Therefore, there is a need to develop a thermoplastic resin composition exhibiting improved appearance quality and improved chemical resistance.

DISCLOSURE

Technical Problem

The present invention is directed to providing a thermoplastic resin composition which exhibits improved heat resistance, improved chemical resistance, and improved appearance characteristics while maintaining basic properties such as processability, hardness, mechanical properties, and the like.

Technical Solution

One aspect of the present invention provides a thermoplastic resin composition which includes: a graft copolymer including a $C_4$ to $C_{10}$ alkyl (meth)acrylate-based monomer unit, a styrene-based monomer unit, and a vinyl cyan-based monomer unit; a first styrene-based copolymer including a $C_1$ to $C_3$ alkyl-substituted styrene-based monomer unit and a vinyl cyan-based monomer unit; and a second styrene-based copolymer including an unsubstituted styrene-based monomer unit and a vinyl cyan-based monomer unit.

Advantageous Effects

A thermoplastic resin composition according to the present invention can attain excellent processability, hardness, colorability, mechanical properties, heat resistance, chemical resistance, and appearance characteristics. Specifically, the thermoplastic resin composition according to the present invention can attain excellent heat resistance and appearance characteristics by including a first styrene-based copolymer including a $C_1$ to $C_3$ alkyl-substituted styrene-based monomer unit and a vinyl cyan-based monomer unit. In addition, the thermoplastic resin composition according to the present invention can attain excellent chemical resistance by including a second styrene-based copolymer including an unsubstituted styrene-based monomer unit and a vinyl cyan-based monomer unit together with the first styrene-based copolymer.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

In the present invention, the weight-average molecular weight of a shell of a graft copolymer may refer to a weight-average molecular weight of a copolymer including a styrene-based monomer unit and a vinyl cyan-based monomer unit which are grafted onto a core.

Here, the styrene-based monomer unit may be one or more selected from the group consisting of a $C_1$ to $C_3$ alkyl-substituted styrene-based monomer unit and an unsubstituted styrene-based monomer unit.

In the present invention, the weight-average molecular weight of a shell of a graft copolymer may be measured as a relative value with respect to a standard polystyrene (PS) sample by gel permeation chromatography (GPC, Waters Breeze) after the graft copolymer is dissolved in acetone and centrifuged and the portion (sol) dissolved in acetone is then dissolved in tetrahydrofuran (THF).

In the present invention, the degree of grafting for a graft copolymer may be calculated by the following equation.

Degree of grafting (%): Weight (g) of grafted monomers/Weight (g) of rubber polymer×100

Weight (g) of grafted monomers: Weight of insoluble substance (gel) obtained after graft copolymer powder is dissolved in acetone and centrifuged Weight (g) of rubber polymer: Weight of $C_4$ to $C_{10}$ alkyl (meth)acrylate-based monomer theoretically added in the preparation of graft copolymer powder In the present invention, the average particle diameters of a seed, a core, and a graft copolymer may be measured by a dynamic light scattering method, specifically, by using a Nicomp 380 instrument (manufactured by PSS).

In the present invention, an average particle diameter may refer to an arithmetic average particle diameter in the particle size distribution as measured by a dynamic light scattering method, specifically, an average particle diameter measured in the scattering intensity distribution.

In the present invention, a weight-average molecular weight may be measured as a relative value with respect to a standard PS sample by GPC (Waters Breeze) using THF as an eluate.

1. Thermoplastic Resin Composition

A thermoplastic resin composition according to an embodiment of the present invention includes: A) a graft copolymer including a $C_4$ to $C_{10}$ alkyl (meth)acrylate-based monomer unit, a styrene-based monomer unit, and a vinyl cyan-based monomer unit; B-1) a first styrene-based copolymer including a $C_1$ to $C_3$ alkyl-substituted styrene-based monomer unit and a vinyl cyan-based monomer unit; and B-2) a second styrene-based copolymer including an unsubstituted styrene-based monomer unit and a vinyl cyan-based monomer unit.

The thermoplastic resin composition according to an embodiment of the present invention may further include C) an olefin-based copolymer including a $C_1$ to $C_3$ alkyl (meth)acrylate-based monomer unit.

Hereinafter, each component of the thermoplastic resin composition of the present invention will be described in detail.

A) Graft Copolymer

The graft copolymer includes a $C_4$ to $C_{10}$ alkyl (meth)acrylate-based monomer unit, a styrene-based monomer unit, and a vinyl cyan-based monomer unit.

The graft copolymer may impart excellent weather resistance and mechanical properties to the thermoplastic resin composition. Specifically, the $C_4$ to $C_{10}$ alkyl (meth)acrylate-based monomer unit may impart excellent weather resistance to the thermoplastic resin composition, and a core of the graft copolymer may impart excellent mechanical properties to the thermoplastic resin composition.

The graft copolymer may have a core-shell structure including: a core formed of a crosslinked polymer including one or more selected from the group consisting of a $C_4$ to $C_{10}$ alkyl (meth)acrylate-based monomer unit, a styrene-based monomer unit, and a vinyl cyan-based monomer unit; and a shell including a styrene-based monomer unit and a vinyl cyan-based monomer unit which are grafted onto the core.

The $C_4$ to $C_{10}$ alkyl (meth)acrylate-based monomer unit may be a unit derived from one or more monomers selected from the group consisting of butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate, and decyl (meth)acrylate, with the unit derived from butyl acrylate being preferred.

The $C_4$ to $C_{10}$ alkyl (meth)acrylate-based monomer unit may be included at 40 to 60 wt % or 45 to 55 wt % with respect to the total weight of the graft copolymer, with the range of 45 to 55 wt % being preferred. When the above-described range is satisfied, the mechanical properties, such as impact resistance and the like, of the first graft copolymer can be improved.

The styrene-based monomer unit may be a unit derived from one or more monomers selected from the group consisting of styrene, α-methylstyrene, p-methylstyrene, and 2,4-dimethylstyrene, with the unit derived from one or more monomers selected from the group consisting of styrene and a-methylstyrene being preferred.

The styrene-based monomer unit may be included at 25 to 50 wt % or 30 to 45 wt % with respect to the total weight of the graft copolymer, with the range of 30 to 45 wt % being preferred. When the above-described range is satisfied, the polymerization of the graft copolymer can more easily proceed. In addition, compatibility of the graft copolymer with the first and second styrene-based copolymers can be improved, and the processability of the thermoplastic resin composition can also be improved.

The vinyl cyan-based monomer unit may be a unit derived from one or more selected from the group consisting of acrylonitrile, methacrylonitrile, and ethacrylonitrile, with the unit derived from acrylonitrile being preferred.

The vinyl cyan-based monomer unit may be included at 3 to 20 wt % or 6 to 17 wt % with respect to the total weight of the graft copolymer, with the range of 6 to 17 wt % being preferred. When the above-described range is satisfied, the chemical resistance of the graft copolymer can be improved.

The graft copolymer may be selected from the group consisting of a butyl acrylate/styrene/acrylonitrile copolymer, a butyl acrylate/a-methylstyrene/acrylonitrile copolymer, and a butyl acrylate/styrene/a-methylstyrene/acrylonitrile copolymer, with the butyl acrylate/styrene/acrylonitrile copolymer being preferred.

The graft copolymer may be included in an amount of 5 to 45 parts by weight or 10 to 35 parts by weight with respect to 100 parts by weight of the sum of the graft copolymer, the first styrene-based copolymer, and the second styrene-based copolymer, with the range of 10 to 35 parts by weight being preferred. When the above-described range is satisfied, the mechanical properties, such as impact resistance and the like, of the thermoplastic resin composition can be significantly improved.

Meanwhile, the graft copolymer may be prepared by a method including the steps of: 1) preparing a core by polymerizing one or more selected from the group consisting of a $C_4$ to $C_{10}$ alkyl (meth)acrylate-based monomer, a styrene-based monomer, and a vinyl cyan-based monomer; and 2) in the presence of the core, preparing a shell by polymerizing a styrene-based monomer and a vinyl cyan-based monomer.

The step of preparing a core may include the steps of: preparing a seed by polymerizing one or more selected from the group consisting of a $C_4$ to $C_{10}$ alkyl (meth)acrylate-based monomer, a styrene-based monomer, and a vinyl cyan-based monomer; and, in the presence of the seed, preparing a core by polymerizing a $C_4$ to $C_{10}$ alkyl (meth)acrylate-based monomer.

Types of the $C_4$ to $C_{10}$ alkyl (meth)acrylate-based monomer, the styrene-based monomer, and the vinyl cyan-based monomer have been described above.

The polymerization may be emulsion polymerization and may be performed at 50 to 85° C. or 60 to 80° C., with the range of 60 to 80° C. being preferred. When the above-described range is satisfied, emulsion polymerization can be stably performed.

The preparation of a seed and a core may be performed in the presence of one or more selected from the group consisting of an emulsifier, an initiator, a crosslinking agent, a grafting agent, an electrolyte, and water.

The emulsifier may be one or more selected from the group consisting of metal salt derivatives of a $C_{12}$ to $C_{18}$ alkyl sulfosuccinic acid and metal salt derivatives of a $C_{12}$ to $C_{20}$ alkyl sulfuric acid ester.

The metal salt derivative of a $C_{12}$ to $C_{18}$ alkyl sulfosuccinic acid may be one or more selected from the group consisting of dicyclohexyl sodium sulfosuccinate, dihexyl sodium sulfosuccinate, di-2-ethylhexyl sodium sulfosuccinate, di-2-ethylhexyl potassium sulfosuccinate, and di-2-ethylhexyl lithium sulfosuccinate.

The metal salt derivative of a $C_{12}$ to $C_{20}$ alkyl sulfuric acid ester may be one or more selected from the group consisting of sodium dodecyl sulfate, sodium dodecylbenzenesulfate, sodium octadecyl sulfate, sodium oleic sulfate, potassium dodecyl sulfate, and potassium octadecyl sulfate.

The initiator may be an inorganic peroxide or an organic peroxide. The inorganic peroxide is a water-soluble initiator and may be one or more selected from the group consisting of potassium persulfate, sodium persulfate, and ammonium persulfate. The organic peroxide is a fat-soluble initiator and may be one or more selected from the group consisting of cumene hydroperoxide and benzoyl peroxide.

The crosslinking agent may be one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, and trimethylolmethane triacrylate.

The grafting agent may be one or more selected from the group consisting of allyl methacrylate, triallyl isocyanurate, triallylamine, and diallylamine.

The electrolyte may be one or more selected from the group consisting of KCl, NaCl, $KHCO_3$, $NaHCO_3$, $K_2CO_3$, $Na_2CO_3$, $KHSO_3$, $NaHSO_4$, $Na_2S_2O_7$, $K_4P_2O_7$, $K_3PO_4$, $Na_3PO_4$ or $Na_2HPO_4$, KOH, and NaOH, with KOH being preferred.

The water serves as a medium in emulsion polymerization and may be ion exchanged water.

Meanwhile, in the preparation of a shell, a styrene-based monomer and a vinyl cyan-based monomer may be polymerized while being continuously added at a predetermined rate. When the $C_1$ to $C_3$ alkyl-substituted styrene-based monomer and the vinyl cyan-based monomer are added by the above-described method, heat can be controlled and a runaway reaction caused by the excessive release of heat can be easily suppressed during polymerization.

The polymerization may be emulsion polymerization and may be performed at 50 to 85° C. or 60 to 80° C., with the range of 60 to 80° C. being preferred. When the above-described range is satisfied, emulsion polymerization can be stably performed.

The preparation of a shell may be performed in the presence of one or more selected from the group consisting of an emulsifier, an initiator, and water.

It is preferable that the polymerization is performed while the emulsifier, initiator, and water are continuously added together with the styrene-based monomer and the vinyl cyan-based monomer. When the above-described condition is satisfied, a constant pH can be maintained to facilitate graft polymerization, and a graft copolymer whose particles have not only excellent stability but also a uniform internal structure can be prepared.

The emulsifier may be a metal salt derivative of a carboxylic acid, and the metal salt derivative of a carboxylic acid may be one or more selected from the group consisting of metal salts of a $C_{12}$ to $C_{20}$ fatty acid and metal salts of rosin acid.

The metal salt of a $C_{12}$ to $C_{20}$ fatty acid may be one or more selected from the group consisting of sodium salts of a fatty acid, sodium laurate, sodium oleate, and potassium oleate.

The metal salt of rosin acid may be one or more selected from the group consisting of sodium rosinate and potassium rosinate.

Types of the initiator have been described above, with the organic peroxide being preferred, and t-butylperoxy ethylhexyl carbonate being more preferred.

Meanwhile, the graft copolymer prepared by the above-described method may be a latex form.

The graft copolymer in latex form may be subjected to coagulation, aging, washing, dehydration, and drying to form a graft copolymer in powder form.

Meanwhile, the graft copolymer may include two types of graft copolymers, i.e., a first graft copolymer and a second graft copolymer, having cores with mutually different average particle diameters to improve the impact resistance, weather resistance, colorability, surface gloss characteristics, and appearance characteristics of the thermoplastic resin composition.

The core of the first graft copolymer may have an average particle diameter of 300 to 500 nm or 350 to 450 nm, with the range of 350 to 450 nm being preferred. When the above-described range is satisfied, the mechanical properties, such as impact resistance and the like, of the thermoplastic resin composition can be improved.

The first graft copolymer may have a degree of grafting of 20 to 100%, 40 to 80%, or 45 to 60%, with the range of 40 to 60% being preferred. When the above-described range is satisfied, compatibility of the first graft copolymer with the first and second styrene-based copolymers is improved, such that the graft copolymer can be uniformly dispersed in the thermoplastic resin composition. In addition, the mechanical properties of the thermoplastic resin composition can be significantly improved.

The shell of the first graft copolymer may have a weight-average molecular weight of 100,000 to 300,000 g/mol or 150,000 to 250,000 g/mol, with the range of 150,000 to 250,000 g/mol being preferred. When the above-described range is satisfied, compatibility of the first graft copolymer with the first and second styrene-based copolymers is improved, such that the graft copolymer can be uniformly dispersed in the thermoplastic resin composition. In addition, the mechanical properties of the thermoplastic resin composition can be significantly improved.

The first graft copolymer may be included in an amount of 5 to 30 parts by weight or 10 to 25 parts by weight with respect to 100 parts by weight of the sum of the first graft copolymer, the second graft copolymer, the first styrene-based copolymer, and the second styrene-based copolymer, with the range of 10 to 25 parts by weight being preferred. When the above-described range is satisfied, the mechanical properties, such as impact resistance and the like, of the thermoplastic resin composition can be significantly improved.

Meanwhile, the core of the second graft copolymer may have an average particle diameter of 50 to 150 nm or 75 to 125 nm, with the range of 75 to 125 nm being preferred. When the above-described range is satisfied, the specific surface area of the core is increased, such that the weather resistance of the thermoplastic resin composition can be significantly improved. In addition, visible light can penetrate without being scattered in the core, such that colorability can be improved. Additionally, surface gloss characteristics and appearance characteristics can be improved.

The second graft copolymer may have a degree of grafting of 20 to 80% or 25 to 60%, with the range of 25 to 60% being preferred. When the above-described range is satisfied, compatibility of the second graft copolymer with the first and second styrene-based copolymers is improved, such that the graft copolymer can be uniformly dispersed in the thermoplastic resin composition. In addition, the colorability and surface gloss characteristics of the thermoplastic resin composition can be significantly improved.

The shell of the second graft copolymer may have a weight-average molecular weight of 50,000 to 200,000 g/mol or 70,000 to 170,000 g/mol, with the range of 70,000 to 170,000 g/mol being preferred. When the above-described range is satisfied, compatibility of the second graft copolymer with the first and second styrene-based copolymers can be improved, and the mechanical properties of the thermoplastic resin composition can be improved.

The second graft copolymer may be included in an amount of 0.1 to 15 parts by weight or 1 to 10 parts by weight with respect to 100 parts by weight of the sum of the first graft copolymer, the second graft copolymer, the first styrene-based copolymer, and the second styrene-based copolymer, with the range of 1 to 10 parts by weight being preferred. When the above-described range is satisfied, the weather resistance, colorability, and surface gloss characteristics of the thermoplastic resin composition can be significantly improved.

The graft copolymer may include the first graft copolymer and the second graft copolymer in a weight ratio of 50:50 to 99:1 or 60:40 to 95:5, with the range of 60:40 to 95:5 being preferred. When the above-described range is satisfied, the thermoplastic resin composition can attain excellent mechanical properties, weather resistance, colorability, and surface gloss characteristics.

B-1) First Styrene-Based Copolymer

The first styrene-based copolymer is a matrix copolymer and includes a $C_1$ to $C_3$ alkyl-substituted styrene-based monomer unit and a vinyl cyan-based monomer unit.

The first styrene-based copolymer may impart excellent heat resistance and excellent appearance characteristics to the thermoplastic resin composition. Specifically, excellent heat resistance can provide improved dimensional stability of a molded article formed of the thermoplastic resin composition and minimized pressure marks.

The $C_1$ to $C_3$ alkyl-substituted styrene-based monomer unit may be a unit derived from one or more selected from the group consisting of a-methylstyrene, p-methylstyrene, and 2,4-dimethylstyrene, with the unit derived from a-methylstyrene being preferred.

Types of the vinyl cyan-based monomer unit have been described above.

The first styrene-based copolymer may be a copolymer of a monomer mixture including a $C_1$ to $C_3$ alkyl-substituted styrene-based monomer and a vinyl cyan-based monomer.

The monomer mixture may include the $C_1$ to $C_3$ alkyl-substituted styrene-based monomer and the vinyl cyan-based monomer in a weight ratio of 60:40 to 90:10 or 65:35 to 85:15, with the range of 65:35 to 85:15 being preferred. When the above-described range is satisfied, heat resistance can be improved. The first styrene-based copolymer may further include an unsubstituted styrene-based monomer unit to facilitate polymerization. That is, the first styrene-based copolymer may be a copolymer of a monomer mixture including a $C_1$ to $C_3$ alkyl-substituted styrene-based monomer, a vinyl cyan-based monomer, and an unsubstituted styrene-based monomer. The unsubstituted styrene-based monomer unit may be a unit derived from styrene.

In this case, the monomer mixture may include the $C_1$ to $C_3$ alkyl-substituted styrene-based monomer at 55 to 75 wt %, the vinyl cyan-based monomer at 20 to 40 wt %, and the unsubstituted styrene-based monomer at 0.1 to 15 wt %. Preferably, the monomer mixture may include the $C_1$ to $C_3$ alkyl-substituted styrene-based monomer at 60 to 70 wt %, the vinyl cyan-based monomer at 25 to 35 wt %, and the unsubstituted styrene-based monomer at 1 to 10 wt % with respect to the total weight of the monomer mixture. When the above-described range is satisfied, the polymerization of the first styrene-based copolymer can more easily proceed.

The first styrene-based copolymer may have a weight-average molecular weight of 50,000 to 150,000 g/mol or 70,000 to 130,000 g/mol, with the range of 70,000 to 130,000 g/mol being preferred. When the above-described range is satisfied, excellent chemical resistance and mechanical properties can be realized.

The first styrene-based copolymer may be selected from the group consisting of an α-methylstyrene/acrylonitrile copolymer and an α-methylstyrene/styrene/acrylonitrile copolymer, with the a-methylstyrene/acrylonitrile copolymer being preferred.

The first styrene-based copolymer may be included in an amount of 2 to 25 parts by weight or 7 to 20 parts by weight with respect to 100 parts by weight of the sum of the graft copolymer, the first styrene-based copolymer, and the second styrene-based copolymer, with the range of 7 to 20 parts by weight being preferred. When the above-described range is satisfied, the heat resistance and processability of the thermoplastic resin composition can be improved, and the appearance characteristics of a thermoplastic resin molded article can be improved.

Even if the graft copolymer includes both a first graft copolymer and a second graft copolymer, the first styrene-based copolymer may be included in the above-described content in the thermoplastic resin composition.

The first styrene-based copolymer may be a copolymer prepared by suspension polymerization or bulk polymerization of a monomer mixture including a $C_1$ to $C_3$ alkyl-substituted styrene-based monomer and a vinyl cyan-based monomer, with the copolymer prepared by bulk polymerization capable of preparing a high-purity polymer being preferred.

B-2) Second Styrene-Based Copolymer

The second styrene-based copolymer is a matrix copolymer and includes an unsubstituted styrene-based monomer unit and a vinyl cyan-based monomer unit.

The second styrene-based copolymer may impart excellent processability, chemical resistance, and mechanical properties to the thermoplastic resin composition.

Types of the unsubstituted styrene-based monomer and the vinyl cyan-based monomer have been described above.

The second styrene-based copolymer may be a copolymer of a monomer mixture including an unsubstituted styrene-based monomer and a vinyl cyan-based monomer.

The monomer mixture may include the unsubstituted styrene-based monomer and the vinyl cyan-based monomer in a weight ratio of 60:40 to 90:10 or 65:35 to 85:15, with the range of 65:35 to 85:15 being preferred. When the above-described range is satisfied, processability and chemical resistance can be improved.

The second styrene-based copolymer may have a weight-average molecular weight of 100,000 to 250,000 g/mol or 130,000 to 220,000 g/mol, with the range of 130,000 to 220,000 g/mol being preferred. When the above-described range is satisfied, excellent chemical resistance and excellent mechanical properties can be realized.

It is preferable that the second styrene-based copolymer is a styrene/acrylonitrile copolymer.

The second styrene-based copolymer may be included in an amount of 50 to 80 parts by weight or 55 to 75 parts by weight with respect to 100 parts by weight of the sum of the graft copolymer, the first styrene-based copolymer, and the second styrene-based copolymer, with the range of 55 to 75 parts by weight being preferred. When the above-described range is satisfied, the processability, chemical resistance, and mechanical properties of the thermoplastic resin composition can be improved.

Even if the graft copolymer includes both a first graft copolymer and a second graft copolymer, the second styrene-based copolymer may be included in the above-described content in the thermoplastic resin composition.

Meanwhile, the first styrene-based copolymer and the second styrene-based copolymer may be included in a weight ratio of 5:95 to 32:68, 9:91 to 25:75, or 10:90 to 20:80 in the thermoplastic resin composition, with the weight ratio of 10:90 to 20:80 being preferred. When the above-described range is satisfied, appearance characteristics and chemical resistance can be improved while the degradation of basic properties such as hardness, mechanical properties, and heat resistance was minimized.

The second styrene-based copolymer may be a copolymer prepared by suspension polymerization or bulk polymerization of a monomer mixture including an unsubstituted styrene-based monomer and a vinyl cyan-based monomer, with the copolymer prepared by bulk polymerization capable of preparing a high-purity polymer being preferred.

C) Olefin-Based Copolymer

The olefin-based copolymer is an additive and may include a $C_1$ to $C_3$ alkyl (meth)acrylate-based monomer unit.

The olefin-based copolymer may impart excellent chemical resistance to the thermoplastic resin composition.

The olefin-based copolymer may be a copolymer of a monomer mixture including a $C_2$ to $C_4$ olefin-based monomer and a $C_1$ to $C_3$ alkyl (meth)acrylate-based monomer. The $C_2$ to $C_4$ olefin-based monomer may be one or more selected from the group consisting of ethylene, propylene, and butene, with ethylene being preferred. The $C_1$ to $C_3$ alkyl (meth)acrylate-based monomer may be one or more selected from the group consisting of methyl (meth)acrylate, ethyl (meth)acrylate, and propyl (meth)acrylate, with methyl acrylate being preferred.

The olefin-based copolymer may include a $C_2$ to $C_4$ olefin-based monomer unit and a $C_1$ to $C_3$ alkyl (meth)acrylate-based monomer unit in a weight ratio of 85:15 to 65:35 or 80:20 to 70:30, with the range of 80:20 to 70:30 being preferred. When the above-described range is satisfied, the chemical resistance of the olefin-based copolymer can be improved. Specifically, when the alkyl (meth)acrylate-based monomer unit is insufficiently included, the compatibility of the olefin-based copolymer with the graft copolymer, the first styrene-based copolymer, and the second styrene-based copolymer is degraded such that it may not be uniformly dispersed in the thermoplastic resin composition, and thus an effect of improving chemical resistance may be degraded. When the alkyl (meth)acrylate-based monomer unit is excessively included, the compatibility of the olefin-based copolymer with the graft copolymer, the first styrene-based copolymer, and the second styrene-based copolymer is improved, but the content of an olefin-based monomer unit is decreased, and thus an effect of improving chemical resistance may be degraded.

The olefin-based copolymer may have a weight-average molecular weight of 50,000 to 200,000 g/mol, 70,000 to 150,000 g/mol, or 90,000 to 120,000 g/mol, with the range of 90,000 to 120,000 g/mol being preferred. When the above-described range is satisfied, the olefin-based copolymer exhibits excellent compatibility with the graft copolymer, the first styrene-based copolymer, and the second styrene-based copolymer, and a thermoplastic resin composition exhibiting excellent mechanical properties can be provided. Specifically, below the above-described range, mechanical properties may be degraded, and above the above-described range, the compatibility of the olefin-based copolymer with the graft copolymer, the first styrene-based copolymer, and the second styrene-based copolymer is degraded such that it may not be uniformly dispersed in the thermoplastic resin composition, and thus an effect of improving chemical resistance may be degraded.

It is preferable that the olefin-based copolymer is an ethylene/methyl acrylate copolymer.

The olefin-based copolymer may be included in an amount of 0.01 to 2 parts by weight or 0.5 to 1 part by weight with respect to 100 parts by weight of the sum of the graft copolymer, the first styrene-based copolymer, and the second styrene-based copolymer, with the range of 0.5 to 1 part by weight being preferred. When the above-described range is satisfied, the chemical resistance of the thermoplastic resin composition can be improved without adversely affecting the hardness, mechanical properties, and heat resistance thereof.

Even if the graft copolymer includes both the first graft copolymer and the second graft copolymer, the olefin-based copolymer may be included in the above-described content in the thermoplastic resin composition.

The olefin-based copolymer may be a commercially available product or directly prepared.

When the olefin-based copolymer is directed prepared, one or more polymerization methods selected from the group consisting of solution polymerization, slurry polymerization, gas-phase polymerization, and high-pressure polymerization may be used.

Meanwhile, the thermoplastic resin composition according to an embodiment of the present invention may further include one or more additives selected from the group consisting of an anti-dripping agent, a flame retardant, an antibacterial agent, an antistatic agent, a stabilizer, a releasing agent, a thermal stabilizer, an UV stabilizer, an inorganic additive, a lubricant, an antioxidant, a photostabilizer, a pigment, a dye, and an inorganic filler.

It is preferable that the thermoplastic resin composition according to an embodiment of the present invention includes one or more selected from the group consisting of a lubricant, an antioxidant, and an UV stabilizer.

A molded article formed of the thermoplastic resin composition according to an embodiment of the present invention may be a sheet, preferably, a decorative sheet for furniture.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1

<Preparation of Seed>

3 parts by weight of styrene, 3 parts by weight of acrylonitrile, 0.1 part by weight of sodium dodecyl sulfate as an emulsifier, 0.03 part by weight of ethylene glycol dimethacrylate as a crosslinking agent, 0.02 part by weight of allyl methacrylate as a grafting agent, 0.025 part by weight of KOH as an electrolyte, and 53.32 parts by weight of distilled water were batch-added to a nitrogen-substituted reactor, and the temperature inside the reactor was raised to 70° C. Afterward, 0.03 part by weight of potassium persulfate as an initiator was batch-added to initiate polymerization, and the polymerization was performed for 2 hours and then terminated, thereby obtaining a seed (average particle diameter: 200 nm).

The average particle diameter of the seed was measured using a Nicomp 380 instrument (manufactured by PSS) by a dynamic light scattering method.

<Preparation of Core>

Polymerization was performed for 4 hours while continuously adding, to the seed-containing reactor, a mixture including 50 parts by weight of butyl acrylate, 0.6 part by weight of sodium dodecyl sulfate as an emulsifier, 0.1 part by weight of ethylene glycol dimethacrylate as a crosslinking agent, 0.04 part by weight of allyl methacrylate as a grafting agent, 30 parts by weight of distilled water, and 0.05 part by weight of potassium persulfate as an initiator at 70° C. and a predetermined rate. After the continuous addition was terminated, polymerization was further performed for another 1 hour and then terminated, thereby obtaining a core (average particle diameter: 400 nm).

The average particle diameter of the core was measured using a Nicomp 380 instrument (manufactured by PSS) by a dynamic light scattering method.

<Preparation of Shell>

Polymerization was performed for 3 hours while adding, to the core-containing reactor, 35 parts by weight of styrene, 9 parts by weight of acrylonitrile, and 39 parts by weight of distilled water and continuously adding each of a first mixture including 1.9 parts by weight of potassium rosinate as an emulsifier and 0.19 part by weight of t-butylperoxy ethylhexyl carbonate as an initiator and a second mixture including 0.16 part by weight of sodium pyrophosphate, 0.24 part by weight of dextrose, and 0.004 part by weight of ferrous sulfate as activators at 75° C. and a predetermined rate. After the continuous addition was completed, polymerization was further performed at 75° C. for another 1 hour and then terminated by lowering the temperature inside the reactor to 60° C., thereby preparing a graft copolymer latex (average particle diameter: 500 nm) including a shell.

The average particle diameter of the graft copolymer latex was measured using a Nicomp 380 instrument (manufactured by PSS) by a dynamic light scattering method.

<Preparation of Graft Copolymer Powder>

The graft copolymer latex was coagulated at 70° C. and atmospheric pressure for 7 minutes by applying 0.8 part by weight of an aqueous calcium chloride solution (concentration: 23 wt %) thereto, aged at 93° C. for 7 minutes, dehydrated, washed, and then dried with 90° C. hot air for 30 minutes, thereby preparing a graft copolymer powder.

Preparation Example 2

<Preparation of Seed>

6 parts by weight of butylacrylate, 0.5 part by weight of sodium dodecyl sulfate as an emulsifier, 0.03 part by weight of ethylene glycol dimethacrylate as a crosslinking agent, 0.02 part by weight of allyl methacrylate as a grafting agent, 0.025 part by weight of KOH as an electrolyte, and 53.32 parts by weight of distilled water were batch-added to a nitrogen-substituted reactor, and the temperature inside the reactor was raised to 70° C. Afterward, 0.03 part by weight of potassium persulfate as an initiator was batch-added to initiate polymerization, and the polymerization was performed for 2 hours and then terminated, thereby obtaining a seed (average particle diameter: 54 nm).

The average particle diameter of the seed was measured using a Nicomp 380 instrument (manufactured by PSS) by a dynamic light scattering method.

<Preparation of Core>

Polymerization was performed for 2.5 hours while continuously adding, to the seed-containing reactor, a mixture including 43 parts by weight of butyl acrylate, 0.5 part by weight of sodium dodecyl sulfate as an emulsifier, 0.1 part by weight of ethylene glycol dimethacrylate as a crosslinking agent, 0.1 part by weight of allyl methacrylate as a grafting agent, 30 parts by weight of distilled water, and 0.05 part by weight of potassium persulfate as an initiator at 70° C. and a predetermined rate. After the continuous addition was terminated, polymerization was further performed for another 1 hour and then terminated, thereby obtaining a core (average particle diameter: 101 nm).

The average particle diameter of the core was measured using a Nicomp 380 instrument (manufactured by PSS) by a dynamic light scattering method.

<Preparation of Shell>

Polymerization was performed for 2.5 hours while adding, to the core-containing reactor, 36 parts by weight of styrene, 15 parts by weight of acrylonitrile, and 39 parts by weight of distilled water and continuously adding each of a first mixture including 1.5 parts by weight of potassium rosinate as an emulsifier, 0.1 part by weight of t-dodecyl mercaptan as a molecular weight controlling agent, and 0.04 part by weight of t-butylperoxy ethylhexyl carbonate as an initiator and a second mixture including 0.1 part by weight of sodium pyrophosphate, 0.12 part by weight of dextrose, and 0.002 part by weight of ferrous sulfate as activators at 75° C. and a predetermined rate. After the continuous addition was completed, polymerization was further performed at 75° C. for another 1 hour and then terminated by lowering the temperature inside the reactor to 60° C., thereby preparing a graft copolymer latex (average particle diameter: 130 nm) including a shell.

The average particle diameter of the graft copolymer latex was measured using a Nicomp 380 instrument (manufactured by PSS) by a dynamic light scattering method.

<Preparation of Graft Copolymer Powder>

A graft copolymer powder was prepared in the same manner as in Preparation Example 1.

Preparation Example 3

A 125-ml high-pressure reactor was evacuated and then filled with nitrogen, and 30 ml of toluene was added thereto. Afterward, the reactor was placed in an appropriate thermostat, 31 mmol of aluminum (III) chloride and then 31 mmol (about 2.67 g) of methyl acrylate were added to the reactor, and the reactor was maintained for 30 minutes until the reaction temperature was stabilized. Afterward, 0.0031 mmol of azobisisobutyronitrile (AIBN) in a dissolved state in 5 ml of chlorobenzene was injected into the reactor. Subsequently, polymerization was performed for 20 hours by filling the reactor with ethylene at 35 bar and raising the reaction temperature to 70° C. After the polymerization was completed, the reaction temperature was lowered to room temperature, and ethanol (non-solvent) was then added to precipitate the prepared copolymer in a solid phase. The solid-phase copolymer was allowed to settle to remove a supernatant, and the resulting solid-phase copolymer was washed by adding ethanol again and then allowed to settle to remove a supernatant. To solidify particles in the remaining solid phase copolymer, water was added thereto, and stirring and filtration were then performed, thereby collecting only a copolymer. The copolymer thus obtained was dried in a vacuum oven set at 60° C. for a day.

Meanwhile, the obtained copolymer had a weight-average molecular weight of 104,000 g/mol and included an ethylene unit at 76 wt % and a methyl acrylate unit at 24 wt %.

The weight-average molecular weight of the obtained copolymer was measured as a relative value with respect to a standard PS sample by gel permeation chromatography (GPC, Waters Breeze) using tetrahydrofuran (THF) as an eluate.

Examples and Comparative Examples

The specifications of components used in Examples and Comparative Examples are as follows.

(A-1) First graft copolymer: The graft copolymer powder prepared in Preparation Example 1 was used.

(A-2) Second graft copolymer: The graft copolymer powder prepared in Preparation Example 2 was used.

(B-1) First styrene-based copolymer: 98UHM (commercially available from LG Chem Ltd., a-methylstyrene/acrylonitrile copolymer, weight-average molecular weight: 100,000 g/mol) was used.

The weight-average molecular weight was measured as a relative value with respect to a standard PS sample by GPC (Waters Breeze) using THF as an eluate.

(B-2) Second styrene-based copolymer: 97HC (commercially available from LG Chem Ltd., styrene/acrylonitrile copolymer, weight-average molecular weight: 170,000 g/mol) was used.

The weight-average molecular weight was measured as a relative value with respect to a standard PS sample by GPC (Waters Breeze) using THF as an eluate.

(C) Olefin-based copolymer: The copolymer prepared in Preparation Example 3 was used.

The above-described components were mixed in contents shown in the following [Table 1] to [Table 3] and stirred to prepare thermoplastic resin compositions.

Experimental Example 1

Each of the thermoplastic resin compositions of Examples and Comparative Examples was put into a twin-screw extruder kneader set at 230° C. to prepare pellets. A physical property of the pellet was evaluated by the method described below, and results thereof are shown in the following [Table 1] to [Table 3].

(1) Melt flow index (g/10 min): measured in accordance with ASTM D1238 at 220° C.

Experimental Example 2

The pellet prepared in Experimental Example 1 was injection-molded to prepare a specimen. Physical properties of the specimen were evaluated by methods described below, and results thereof are shown in the following [Table 1] to [Table 3].

(2) Hardness: measured in accordance with ASTM 785.

(3) IZOD impact strength (kg·cm/cm): measured in accordance with ASTM 256.

(4) Heat deflection temperature (° C.): measured in accordance with ASTM D648.

Experimental Example 3

The pellet prepared in Experimental Example 1 was extruded through a film extruder to form a 0.3-mm film. Physical properties of the film were evaluated by methods described below, and results thereof are shown in the following [Table 1] to [Table 3].

(5) Film appearance: determined by evaluating pressure marks and bumps on the film through visual inspection.

x: deformed film, ○: good, ⊚: excellent (6) Chemical resistance: evaluated based on the time required for the film to start dissolving after the film was immersed in a beaker containing methyl ethyl ketone for 2 minutes.

x: 20 seconds or less, ○: more than 40 seconds and less than 100 seconds, and ⊚: 100 seconds or more

TABLE 1

| Classification | Examples | | | |
|---|---|---|---|---|
| | 1 | 2 | 3 | 4 |
| (A-1) First graft copolymer (parts by weight) | 14 | 14 | 14 | 14 |
| (A-2) Second graft copolymer (parts by weight) | 7 | 7 | 7 | 7 |
| (B-1) First styrene-based copolymer (parts by weight) | 15 | 15 | 15 | 15 |
| (B-2) Second styrene-based copolymer (parts by weight) | 64 | 64 | 64 | 64 |
| (C) Olefin-based copolymer (parts by weight) | — | 0.5 | 0.7 | 1 |
| Weight ratio of first and second styrene-based copolymers | about 19:81 | about 19:81 | about 19:81 | about 19:81 |
| Melt flow index | 12 | 12.9 | 13.1 | 13.3 |
| Hardness | 114 | 112.1 | 111.5 | 110.9 |
| Impact strength | 7.5 | 7 | 6.8 | 6.5 |
| Heat deflection temperature | 90 | 89.8 | 89.5 | 89 |
| Film appearance | ⊚ | ⊚ | ○ | ○ |
| Chemical resistance | ○ | ⊚ | ⊚ | ⊚ |

(A-1) First graft copolymer: The ASA graft copolymer (average particle diameter of core: 400 nm) of Preparation Example 1
(A-2) Second graft copolymer: The ASA graft copolymer (average particle diameter of core: 101 nm) of Preparation Example 2
(B-1) First styrene-based copolymer: 98UHM (commercially available from LG Chem Ltd., α-methylstyrene/acrylonitrile copolymer, weight-average molecular weight: 100,000 g/mol)
(B-2) Second styrene-based copolymer: 97HC (commercially available from LG Chem Ltd., styrene/acrylonitrile copolymer, weight-average molecular weight: 170,000 g/mol)
(C) Olefin-based copolymer: The copolymer (methyl acrylate unit at 24 wt % and ethylene unit at 76 wt %, weight-average molecular weight: 104,000 g/mol) of Preparation Example 3

TABLE 2

| Classification | Comparative Examples | | Examples | | |
|---|---|---|---|---|---|
| | 1 | 2 | 5 | 6 | 7 |
| (A-1) First graft copolymer (parts by weight) | 3 | 14 | 14 | 14 | 14 |

TABLE 2-continued

|  | Comparative Examples | | Examples | | |
| --- | --- | --- | --- | --- | --- |
| Classification | 1 | 2 | 5 | 6 | 7 |
| (A-2) Second graft copolymer (parts by weight) | 35 | 7 | 7 | 7 | 7 |
| (B-1) First styrene-based copolymer (parts by weight) | — | — | 1 | 7 | 8 |
| (B-2) Second styrene-based copolymer (parts by weight) | 62 | 79 | 78 | 72 | 71 |
| (C) Olefin-based copolymer (parts by weight) | 0.5 | 0.5 | 0.5 | 0.5 | 0.5 |
| Weight ratio of first and second styrene-based copolymers | — | — | about 1:99 | about 9:91 | about 10:90 |
| Melt flow index | 7 | 12.4 | 12.4 | 12.3 | 12.3 |
| Hardness | 103 | 112.3 | 112.3 | 112.1 | 112.1 |
| Impact strength | 5.9 | 6.9 | 6.9 | 7 | 7 |
| Heat deflection temperature | 84 | 84.7 | 84.9 | 86.9 | 87.4 |
| Film appearance | X | X | ○ | ○ | ◎ |
| Chemical resistance | ○ | ◎ | ◎ | ◎ | ◎ |

(A-1) First graft copolymer: The ASA graft copolymer (average particle diameter of core: 400 nm) of Preparation Example 1
(A-2) Second graft copolymer: The ASA graft copolymer (average particle diameter of core: 101 nm) of Preparation Example 2
(B-1) First styrene-based copolymer: 98UHM (commercially available from LG Chem Ltd., α-methylstyrene/acrylonitrile copolymer, weight-average molecular weight: 100,000 g/mol)
(B-2) Second styrene-based copolymer: 97HC (commercially available from LG Chem Ltd., styrene/acrylonitrile copolymer, weight-average molecular weight: 170,000 g/mol)
(C) Olefin-based copolymer: The copolymer (methyl acrylate unit at 24 wt % and ethylene unit at 76 wt %, weight-average molecular weight: 104,000 g/mol) of Preparation Example 3

TABLE 3

|  | Examples | | | Comparative Example |
| --- | --- | --- | --- | --- |
| Classification | 8 | 9 | 10 | 3 |
| (A-1) First graft copolymer (parts by weight) | 14 | 14 | 14 | 14 |
| (A-2) Second graft copolymer (parts by weight) | 7 | 7 | 7 | 7 |
| (B-1) First styrene-based copolymer (parts by weight) | 25 | 27 | 30 | 79 |
| (B-2) Second styrene-based copolymer (parts by weight) | 54 | 52 | 49 | — |
| (C) Olefin-based copolymer (parts by weight) | 0.5 | 0.5 | 0.5 | 0.5 |
| Weight ratio of first and second styrene-based copolymers | about 32:68 | about 34:66 | about 38:62 | — |
| Melt flow index | 12.3 | 12.3 | 12.1 | 12 |
| Hardness | 111.9 | 111.7 | 111.6 | 111.4 |
| Impact strength | 7.2 | 7.2 | 7.3 | 7.6 |
| Heat deflection temperature | 91.3 | 91.5 | 91.8 | 97 |
| Film appearance | ◎ | ○ | ○ | ○ |
| Chemical resistance | ○ | ○ | ○ | X |

(A-1) First graft copolymer: The ASA graft copolymer (average particle diameter of core: 400 nm) of Preparation Example 1
(A-2) Second graft copolymer: The ASA graft copolymer (average particle diameter of core: 101 nm) of Preparation Example 2
(B-1) First styrene-based copolymer: 98UHM (commercially available from LG Chem Ltd., α-methylstyrene/acrylonitrile copolymer, weight-average molecular weight: 100,000 g/mol)
(B-2) Second styrene-based copolymer: 97HC (commercially available from LG Chem Ltd., styrene/acrylonitrile copolymer, weight-average molecular weight: 170,000 g/mol)
(C) Olefin-based copolymer: The copolymer (methyl acrylate unit at 24 wt % and ethylene unit at 76 wt %, weight-average molecular weight: 104,000 g/mol) of Preparation Example 3

Referring to Table 1 to Table 3, it can be seen that Example 1, in which a first graft copolymer, a second graft copolymer, a first styrene-based copolymer, and a second styrene-based copolymer were included, was excellent in all of hardness, impact strength, a heat deflection temperature, film appearance, and chemical resistance. In addition, it can be seen that Example 2 to Example 4, in which an olefin-based copolymer was further included as compared with Example 1, exhibited improved chemical resistance compared to Example 1. Additionally, when Example 2 to Example 4 were compared, it can be seen that in the case of Example 2 in which a small amount of an olefin-based copolymer was included, chemical resistance was improved while the degradation of hardness, impact strength, and a heat deflection temperature was minimized.

When Comparative Example 2, Example 2, Example 5 to Example 10, and Comparative Example 3, which were carried out by varying the weight ratio of a first styrene-based copolymer and a second styrene-based copolymer, were compared, it can be seen that as the content of a first styrene-based copolymer was increased, a heat deflection temperature was improved, and as the content of a second styrene-based copolymer was increased, hardness was increased. In addition, it can be seen that in the case of Example 2, Example 7, and Example 8 in which a first styrene-based copolymer and a second styrene-based copolymer were included in a weight ratio of about 10:90 to about 32:68, film appearance and chemical resistance were improved while the degradation of hardness and impact strength was minimized. It can be seen that Comparative Example 1 and Comparative Example 2, in which a first styrene-based copolymer was not included, exhibited significantly degraded impact strength and significantly degraded film appearance, and Comparative Example 3, in which a second styrene-based copolymer was not included, exhibited significantly degraded chemical resistance.

The invention claimed is:

1. A thermoplastic resin composition comprising:
a graft copolymer including a $C_4$ to $C_{10}$ alkyl (meth)acrylate-based monomer unit, a styrene-based monomer unit, and a vinyl cyan-based monomer unit;
a first styrene-based copolymer including a $C_1$ to $C_3$ alkyl-substituted styrene-based monomer unit and a vinyl cyan-based monomer unit; and
a second styrene-based copolymer including an unsubstituted styrene-based monomer unit and a vinyl cyan-based monomer unit,
wherein a weight ratio of the first styrene-based copolymer: the second styrene-based copolymer is 5:95 to 32:68 in the thermoplastic composition.

2. The thermoplastic resin composition of claim 1, wherein the graft copolymer includes two types of graft copolymers having cores with mutually different average particle diameters.

3. The thermoplastic resin composition of claim 2, wherein the graft copolymer includes a first graft copolymer having a core with an average particle diameter of 300 to 500 nm and a second graft copolymer having a core with an average particle diameter of 50 to 150 nm.

4. The thermoplastic resin composition of claim 1, wherein the graft copolymer is one or more selected from the group consisting of a butyl acrylate/styrene/acrylonitrile copolymer, a butyl acrylate/α-methylstyrene/acrylonitrile copolymer, and a butyl acrylate/styrene/α-methylstyrene/acrylonitrile copolymer.

5. The thermoplastic resin composition of claim 1, wherein the first styrene-based copolymer is selected from the group consisting of an α-methylstyrene/acrylonitrile copolymer and an α-methylstyrene/styrene/acrylonitrile copolymer.

6. The thermoplastic resin composition of claim 1, wherein the second styrene-based copolymer is a styrene/acrylonitrile copolymer.

7. The thermoplastic resin composition of claim 1, which includes, with respect to 100 parts by weight of the sum of the graft copolymer, the first styrene-based copolymer, and the second styrene-based copolymer:
    5 to 45 parts by weight of the graft copolymer;
    2 to 25 parts by weight of the first styrene-based copolymer; and
    50 to 80 parts by weight of the second styrene-based copolymer.

8. The thermoplastic resin composition of claim 3, which includes, with respect to 100 parts by weight of the sum of the first graft copolymer, the second graft copolymer, the first styrene-based copolymer, and the second styrene-based copolymer:
    5 to 30 parts by weight of the first graft copolymer;
    0.1 to 15 parts by weight of the second graft copolymer;
    2 to 25 parts by weight of the first styrene-based copolymer; and
    50 to 80 parts by weight of the second styrene-based copolymer.

9. The thermoplastic resin composition of claim 1, further comprising an olefin-based copolymer including a $C_1$ to $C_3$ alkyl (meth)acrylate-based monomer unit.

10. The thermoplastic resin composition of claim 9, wherein the olefin-based copolymer includes a $C_2$ to $C_4$ olefin-based monomer unit and the $C_1$ to $C_3$ alkyl (meth)acrylate-based monomer unit in a weight ratio of 85:15 to 65:35.

11. The thermoplastic resin composition of claim 9, wherein the olefin-based copolymer includes a $C_2$ to $C_4$ olefin-based monomer unit and the $C_1$ to $C_3$ alkyl (meth)acrylate-based monomer unit in a weight ratio of 80:20 to 70:30.

12. The thermoplastic resin composition of claim 9, wherein the olefin-based copolymer has a weight-average molecular weight of 50,000 to 200,000 g/mol.

13. The thermoplastic resin composition of claim 9, wherein the olefin-based copolymer is an ethylene/methyl acrylate copolymer.

14. The thermoplastic resin composition of claim 9, which includes, with respect to 100 parts by weight of the sum of the graft copolymer, the first styrene-based copolymer, and the second styrene-based copolymer,
    0.01 to 2 parts by weight of the olefin-based copolymer.

15. A thermoplastic resin composition comprising:
    a graft copolymer including a $C_4$ to $C_{10}$ alkyl (meth)acrylate-based monomer unit, a styrene-based monomer unit, and a vinyl cyan-based monomer unit;
    a first styrene-based copolymer including a $C_1$ to $C_3$ alkyl-substituted styrene-based monomer unit and a vinyl cyan-based monomer unit; and
    a second styrene-based copolymer including an unsubstituted styrene-based monomer unit and a vinyl cyan-based monomer unit,
    wherein the thermoplastic resin composition includes, with respect to 100 parts by weight of the sum of the graft copolymer, the first styrene-based copolymer, and the second styrene-based copolymer:
    5 to 45 parts by weight of the graft copolymer;
    2 to 25 parts by weight of the first styrene-based copolymer; and
    50 to 80 parts by weight of the second styrene-based copolymer.

16. A thermoplastic resin composition comprising:
    a graft copolymer including a $C_4$ to $C_{10}$ alkyl (meth)acrylate-based monomer unit, a styrene-based monomer unit, and a vinyl cyan-based monomer unit;
    a first styrene-based copolymer including a $C_1$ to $C_3$ alkyl-substituted styrene-based monomer unit and a vinyl cyan-based monomer unit;
    a second styrene-based copolymer including an unsubstituted styrene-based monomer unit and a vinyl cyan-based monomer unit; and
    an olefin-based copolymer including a $C_1$ to $C_3$ alkyl (meth)acrylate-based monomer unit,
    wherein the olefin-based copolymer has a weight-average molecular weight of 70,000 to 150,000 g/mol.

* * * * *